(12) United States Patent
Umeno et al.

(10) Patent No.: US 6,383,686 B1
(45) Date of Patent: May 7, 2002

(54) ANODE MATERIAL FOR LITHIUM SECONDARY BATTERY, LITHIUM SECONDARY BATTERY USING SAID ANODE MATERIAL, AND METHOD FOR CHARGING OF SAID SECONDARY BATTERY

(75) Inventors: Tatsuo Umeno; Kenji Fukuda; Tadanori Tsunawaki; Takashi Hiruta; Yoshinori Yasumoto; Youichiro Hara, all of Fukuoka; Osamu Matsunaga, Tochigi, all of (JP)

(73) Assignee: Mitsui Mining Co., Ltd., Tokyo (JP)

( * ) Notice: Subject to any disclaimer, the term of this patent is extended or adjusted under 35 U.S.C. 154(b) by 0 days.

(21) Appl. No.: 09/488,714

(22) Filed: Jan. 21, 2000

(30) Foreign Application Priority Data

Jan. 26, 1999 (JP) ............................................. 11-016748

(51) Int. Cl.[7] ........................ H01M 4/02; H01M 4/36; H01M 10/04
(52) U.S. Cl. ................................. 429/231.8; 429/218.1
(58) Field of Search ............................ 429/231.8, 218.1

(56) References Cited

U.S. PATENT DOCUMENTS 5,482,797 A * 1/1996 Yamada et al. ............. 429/218

OTHER PUBLICATIONS

A. M. Wilson, et al., "Nanodispersed Silicon in Pregraphitic Carbons," J. Appl. Phys., vol. 77, No. 6, (Mar. 15, 1995), pp. 2363–2369.

A. M. Wilson, et al., "Carbons Containing Nanodispersed Silicon as Anodes for Li–Ion Cells," The Electrochemical Society Proceedings, vol. 94–28, pp. 158–164.

* cited by examiner

*Primary Examiner*—Hoa Van Le
(74) *Attorney, Agent, or Firm*—Oblon, Spivak, McClelland, Maier & Neustadt, P.C.

(57) ABSTRACT

The present invention discloses an anode material for lithium secondary battery, comprising a particulate core composed of a metal or semimetal capable of forming a lithium alloy and a carbon layer covering the surface of the particulate core; a lithium secondary battery using said anode material; and a method for discharging of said secondary battery.

18 Claims, 2 Drawing Sheets

○ : Silicon
△ : Silicon oxide
✦ : Carbon

ANODE MATERIAL FOR LITHIUM SECONDARY BATTERY, LITHIUM SECONDARY BATTERY USING SAID ANODE MATERIAL, AND METHOD FOR CHARGING OF SAID SECONDARY BATTERY

BACKGROUND OF THE INVENTION

1. Field of the Invention

The present invention relates to an anode material for lithium secondary battery which has a large capacity, high safety and excellent charging and discharging cycle property; a lithium secondary battery using the above anode material; and a method for charging of the secondary battery.

2. Description of the Related Art

As electronic appliances have become smaller and lighter, the batteries used therein are required to have a higher energy density. There are also required secondary batteries allowing repeated charging and discharging, from the standpoint of resource saving. In order to respond to these requirements, secondary batteries using lithium have been proposed and developed. At the initial stage of development of secondary batteries using lithium, metallic lithium was used as the anode material. The secondary batteries using metallic lithium, i.e. metallic lithium secondary batteries, however, are inferior in rapid chargeability and have a short cycle life; moreover, they form dendrite at the anode (this may cause firing and explosion) and have a problem in safety. In order to solve the problem, there are currently in wide practical use lithium secondary batteries using, in the anode, a carbon-based material and/or a graphite-based material, i.e. lithium ion secondary batteries.

In order to allow various lithium secondary batteries including lithium ion secondary batteries to have a higher capacity, researches are being continued on the cathode material, anode material and electrolyte used therein. As the cathode material, $LiCoO_2$ has been used mainly. The reason is that the cathode using this material is easy to produce and has relatively high safety. Lately, it is being investigated to produce a cathode using $LiNiO_2$ or $LiMn_2O_4$ both having a larger theoretical capacity than $LiCoO_2$ has.

With respect to the anode material, metallic lithium has a far larger theoretical discharging capacity (4,000 mAh/g) than graphite (372 mAh/g) but has problems in short cycle life and safety. Therefore, in order to solve these problems and achieve a higher capacity, active researches are under way still on a secondary battery using metallic lithium as the anode material. Researches are under way also on a lithium secondary battery using, as the anode material, a lithium alloy having a discharging capacity close to that of metallic lithium.

Various investigations have been made as well on the electrolyte of lithium secondary battery. Researches have been made also on the improvement of solid electrolyte in lithium solid secondary battery or on the improvement of polymer electrolyte in polymer lithium secondary battery.

It is not an exaggeration to say that the high capacity to be possessed by a lithium secondary battery depends upon the capacity level of the anode material used therein.

With respect to the electrodes of lithium secondary battery, there are reports by A. M. Wilsons et al. In J. Appl. Phys. 77(6), Mar. 15, 1995 and The Electrochemical Society Proceedings Volume 94–28, it is disclosed to synthesize a silicon compound material wherein silicon particles having particle diameters of nm order are dispersed in carbon, by chemical vapor deposition, i.e. by heating the vapor of a silicon-containing compound and the vapor of a carbon-containing compound in a quartz tube to give rise to a reaction and depositing the reaction product. It is also disclosed that each component is very finely dispersed in the above silicon compound material and therefore the material is substantially silicon carbide and that an anode made using the silicon compound material has a discharging capacity of about 500 mAh/g and good cycle property. This silicon compound material, however, is difficult to synthesize on an industrial scale.

As described above, in the researches of lithium secondary battery, it has been attempted to use a lithium alloy as the anode material. As the lithium alloy, there can be mentioned, for example, lithium-tin alloy, lithium-lead alloy, lithium-bismuth alloy, lithium-aluminum alloy, lithium-arsenic alloy, lithium-silicon alloy and lithium-antimony alloy. These alloys can be used per se as an anode material. However, in many cases, a metal or semimetal capable of forming a lithium alloy is used as an anode material and a battery is assembled. Upon charging of the battery, the metal or semimetal is electrochemically reacted with the lithium liberated form the cathode of the battery, to form an alloy, and this alloy is used as the anode material of the battery. In this battery, however, the volume of the anode expands several-fold at the time of alloying as compared with the volume before alloying; therefore, the alloy is powderized inevitably. Thus, the battery has no improvement in safety or cycle property. Therefore, no lithium secondary battery using a lithium alloy as the anode material is in practical application.

In order to realize an excellent lithium secondary battery, the present inventors made an intensive study for development of an anode material composed of a lithium alloy free from the above problem. The biggest problem in using a lithium alloy as the anode material of lithium secondary battery lies in that volume expansion takes place in formation of a lithium alloy and consequently the powderization and destruction of anode arises.

SUMMARY OF THE INVENTION

In order to solve the problem of electrode powderization and destruction, the present inventors made a further study. As a result, the present inventors found out that the problem of electrode (anode) powderization and destruction can be prevented by covering a metal or semimetal capable of forming a lithium alloy, with carbon.

The present inventors further found out that when a metal or semimetal capable of forming a lithium alloy is covered with carbon, the resulting carbon layer has an inhibitory action against the expansion of the metal or semimetal capable of forming a lithium alloy and, as a result, the powderization and destruction of electrode (anode) can be prevented.

That is, by using the particles of a metal or semimetal capable of forming a lithium alloy, as a core and covering this particulate core with carbon, a composite material having a double structure of a particulate core and a carbon layer can be obtained. In this composite material, the carbon layer has an inhibitory action against the expansion of the metal or semimetal capable of forming a lithium alloy. When this composite material is charged, the particulate core, i.e. the metal or semimetal becomes a lithium alloy. In this case, however, since the expansion of the metal or semimetal during its alloying is suppressed by the strong inhibitory action of the carbon layer, the powderization and destruction of electrode (anode) is prevented.

Next, it was made clear that as the metal or semimetal constituting the particulate core, capable of forming a lithium alloy, there is preferred titanium, iron, boron, silicon or the like, and silicon is particularly preferred.

It was also made clear that, of various methods for covering the particulate core with carbon, chemical vapor deposition is particularly preferred. By using this chemical vapor deposition, a strong inhibitory action against the volume expansion of the particulate core is obtained and uniform and complete covering is made possible with a small amount of carbon.

The present inventors made a study also on the charging conditions to be employed when the composite material obtained as above is used as an anode material for lithium secondary battery. As a result, there was obtained a lithium secondary battery which has high safety and high capacity, which is free from the problems of the prior art, and which has excellent properties not seen in conventional lithium secondary batteries. The present invention has been completed based on the above findings.

The anode material and secondary battery according to the present invention can be easily produced on an industrial scale.

An object of the present invention is to provide an anode material which is free from the above-mentioned problems, which causes neither powderization nor destruction of electrode, and which can realize a lithium secondary battery high in discharging capacity and safety and superior in cycle property. Further objects of the present invention are to provide a lithium secondary battery using the above anode material, and a method for charging of the secondary battery.

The present invention are as described below.

1. An anode material for lithium secondary battery, comprising
   a particulate core composed of a metal or semimetal capable of forming a lithium alloy, and
   a carbon layer covering the surface of the particulate core.
2. An anode material for lithium secondary battery, comprising
   a particulate core composed of silicon, and
   a carbon layer covering the surface of the particulate core.
3. An anode material for lithium secondary battery according to the above 1 or 2, wherein the average particle diameter of the particulate core is 0.1 to 50 $\mu$m and the specific surface area of the anode material is 5 m$^2$/g or less.
4. An anode material for lithium secondary battery according to the above 1 or 2, wherein the carbon content of the anode material is 5 to 50% by weight.
5. An anode material for lithium secondary battery according to the above 1 or 2, wherein the carbon layer covering the surface of the particulate core is formed by chemical vapor deposition.
6. An anode material for lithium secondary battery according to the above 1 or 2, wherein the carbon in the anode material has a lattice constant $C_{0(002)}$ of 0.680 to 0.720 nm.
7. A lithium secondary battery using, in the anode, an anode material set forth in the above 1.
8. A lithium secondary battery using, in the anode, an anode material set forth in the above 2.
9. A method for charging of a lithium secondary battery set forth in the above 8, wherein the charging density is 1,500 mAh/g or less.
10. A method for charging of a lithium secondary battery set forth in the above 8, wherein the final charging voltage is 30 to 100 mV (reference electrode=metallic lithium).

DETAILED DESCRIPTION OF THE INVENTION

Figure 1:
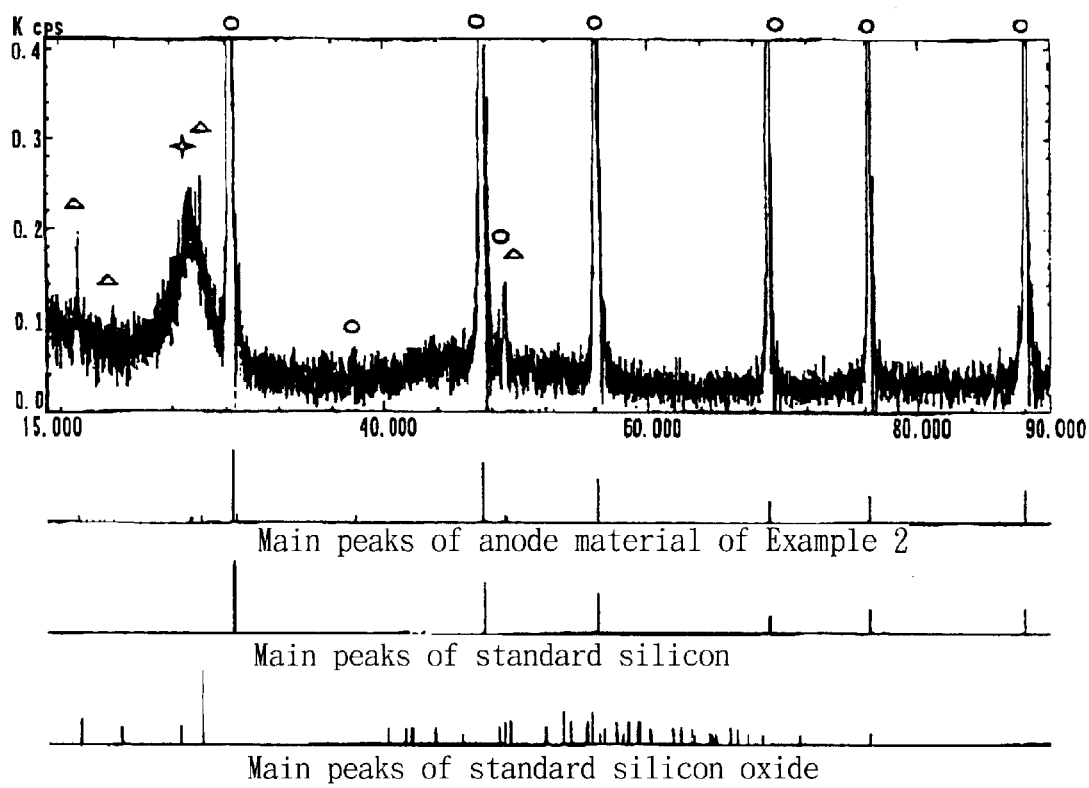
FIG. 1 is an XRD profile of the anode material of Example 2.

The anode material of the present invention comprises a particulate core and a carbon layer covering the particulate core. The particles constituting the particulate core are preferred to be as small as possible, i.e. 50 $\mu$m or less in terms of average particle diameter so that the volume expansion of the particulate core at the time of alloying can be suppressed as low as possible. However, a particulate core consisting of too small particles is not preferred because such a particulate core has a large total surface area and a large amount of carbon is required for covering the surface area. Therefore, the average particle diameter of the particulate core is preferably not less than 0.1 $\mu$m.

The particles constituting the particulate core can be appropriately selected from metals and semimetals capable of forming a lithium alloy. In order to obtain large charging and discharging capacities, it is preferred that the metal or semimetal can take in lithium of an amount as large as possible per unit weight of the metal or semimetal. Further, the metal or semimetal is preferred to be a flame-retardant material from the standpoint of safety. Furthermore, since the metal or semimetal is covered with carbon, the metal or semimetal is preferred to have a melting point and a boiling point not lower than the temperature at which the metal or semimetal is covered with carbon, i.e. a melting point and a boiling point of 750° C. or more, particularly 900° C. or more. In view of all these matters, the particulate core capable of forming a lithium alloy is preferably composed of titanium, iron, boron, silicon or the like; and silicon is particularly preferred because it is flame-retardant and highly safe and has a melting point of 1,410° C. which is higher than the temperature used in carbon coverage.

The silicon used in the present invention may be either crystalline or amorphous. The purity of silicon is sufficient at about 98% by weight. The reason why the silicon purity has a allowable range, is that the silicon oxide present in silicon as a major impurity is inactive electrochemically. However, the presence of a halogen-based impurity (e.g. chlorine) is not preferred. The reason is that the halogen reacts with lithium ion during charging, increasing the irreversible capacity.

The anode material of the present invention is a composite material obtained by covering the above-mentioned particulate core with carbon.

As the method for covering the particulate core with carbon, there can be used various methods capable of producing a strong inhibitory action against the volume expansion caused by the alloying of the particulate core.

These covering methods include a method which comprises covering the particulate core with a resin, for example, a synthetic resin such as phenolic resin, imide resin, COPNA resin or the like and subjecting the resin to infusibilization and further to carbonization at 900 to 1,200° C. There is other method which comprises covering the particulate core with a known tar or pitch and subjecting the tar or pitch to infusibilization and further to carbonization at 900 to 1,200° C. There is still other method wherein a resin such as aromatic sulfonic acid salt or the like is used so that infusibilization need not be conducted.

These covering methods using a resin, a tar or a pitch are simple; therefore, they are effective as a method for forming a carbon layer having a strong inhibitory action against the volume expansion of the particulate core during its alloying.

As the method for covering the particulate core with carbon, there is, besides the above-mentioned methods using a resin, a tar or a pitch, an effective method, i.e. chemical vapor deposition which comprises introducing the vapor of an organic substance into a heated particulate core and subjecting the organic substance vapor to carbonization and deposition on the surface of the particulate core.

When the particulate core is covered with carbon, it is necessary that the carbon can impart, to the particulate core, an inhibitory action against the volume expansion of the particulate core caused by its alloying. Meanwhile, the surface of the particulate core must be covered with carbon uniformly and completely. If the coverage with carbon is incomplete and, after the assembling of battery, part of the particulate core is exposed to the electrolytic solution, the powderization of the alloy proceeds quickly and the cycle property of the battery is deteriorated strikingly.

Hence, in covering the particulate core with carbon, the amount of carbon in anode material is preferably 5 to 50% by weight.

An amount of carbon in anode material, of more than 50% by weight is not preferred. The reason is that since carbon has a theoretical discharging capacity far smaller than that of a lithium alloy, the anode using such an anode material has a small discharging capacity. When an anode material containing carbon in an amount of more than 50% by weight is produced by a covering method using a resin, a tar or a pitch, fusion tends to occur between particles and the conversion of primary particles of anode material into secondary particles becomes striking. In this case, the anode material comprising secondary particles need be ground after the covering, which is not preferred.

In order to prevent the powderization of alloy, it is necessary to cover the particulate core with carbon completely. The minimum amount of carbon required for complete coverage is hereinafter called "carbon amount required for complete coverage".

The carbon amount required for complete coverage is 20% by weight in anode material, in the covering method using a resin, a tar or a pitch.

The reason why the carbon amount required for complete coverage is as large as 20% by weight in the above covering method, is that the resin, tar or pitch as a carbon source is low in yield (carbonization yield) when heated and converted into a carbon layer and further is high in volume contraction in carbonization, easily generating cracks in the carbon layer formed.

Meanwhile, in the covering method by chemical vapor deposition, uniform and complete coverage with carbon is possible without seeing fusion between particles. Therefore, in the covering method by chemical vapor deposition, the amount of carbon deposited for coverage can be set in a wider range than in the covering method using a resin, a tar or a pitch. In chemical vapor deposition, the carbon amount required for complete coverage is 5% by weight in anode material and is less than that in the covering method using a resin, a tar or a pitch.

The uniformity of the coverage with carbon can be examined by measuring the specific surface area of anode material. More uniform and more complete coverage gives an anode material having a smaller specific surface area. The specific surface area of anode material is set preferably at 5 $m^2/g$ or less.

In the covering method by chemical vapor deposition, the specific surface area of anode material can be set at 5 $m^2/g$ or less easily, because coverage with carbon can be made more uniformly and more completely than in other covering methods.

The coverage of particulate core with carbon by chemical vapor deposition is conducted preferably with the particulate core kept in a fluidized state. By conducting chemical vapor deposition in a fluidized state, a carbon film can be formed on the surface of the particulate core even more uniformly and completely.

Thus, the feature of chemical vapor deposition is that the particulate core can be covered with a small amount of carbon uniformly and completely. Since the surface of the particulate core is covered with carbon completely, the volume expansion of particulate core caused by its alloying is inhibited and the powderization and destruction of electrode (anode) can be prevented. Further, the surface oxidation of the particulate core, which tends to occur during charging and discharging, can be suppressed as well.

Uniform coverage with carbon further improves the conductivity of particulate core. As a result, lithium is supplied uniformly to the particulate core from the whole outer surface of the carbon layer, whereby alloying is allowed to take place easily and local powderization of alloy is hindered.

The above improvement in conductivity contributes also to improvement in charging and discharging speeds.

As a further feature, the covering method by chemical vapor deposition can be easily carried out on an industrial scale.

Next, there are described, in detail, the conditions when carbon coverage by chemical vapor deposition is conducted in order to obtain an anode material for lithium secondary battery as an embodiment of the present invention.

The temperature of chemical vapor deposition is preferably 700 to 1,200° C., more preferably 850 to 1,100° C. When the temperature of chemical vapor deposition is lower than 700° C., the deposition speed of pyrolytic carbon during chemical vapor deposition is small and a long time is needed for chemical vapor deposition. Also, when the temperature of chemical vapor deposition is lower than 700° C., the deposited carbon has a high electrical resistance and, when a lithium secondary battery is produced using the resulting anode material, the battery shows small charging and discharging speeds. Further, the carbon has a low strength and consequently has an insufficient inhibitory action against the volume expansion of particulate core during its alloying.

As the temperature of chemical vapor deposition is higher, the conversion of organic substance gas into carbon is high. However, when the temperature of chemical vapor deposition is higher than 1,200° C., carbon grows in a fiber shape rather than in a film shape although the conversion of organic substance gas into carbon is high; therefore, such a high temperature is not preferred for the surface coverage of particulate core.

As the organic substance used as a carbon source in chemical vapor deposition, there can be mentioned, benzene, toluene, xylene, styrene, ethylbenzene, diphenylmethane, diphenyl, naphthalene, phenol, cresol, nitrobenzene, chlorobenzene, indene, coumarone, pyridine, anthracene, phenanthrene, and mixtures thereof. There can also be used, singly or in admixture, gas light oil, creosote oil, anthracene oil (these are obtained from tar distillation), naphtha-cracked tar oil and aliphatic hydrocarbons (e.g. methane, ethane, propane, butane, pentane and hexane). There can also be used acetylene, ethylene, propylene, isopropylene, butadiene, etc. When a chloride such as trichloroethylene, dichloroethylene or the like is used as a carbon source, the temperature of chemical vapor deposition can be lowered to 700 to 800° C.

The carbon constituting the surface layer of the anode material is preferably crystalline so that it can have a high conductivity. However, too high a crystallinity is not preferred because it results in a low strength of each carbon layer and, consequently, the inhibition of the volume expansion of the particulate core during its alloying is difficult.

Therefore, the carbon constituting the surface layer of the anode material is preferred to have, as an indication of the crystallinity, a lattice constant $C_{0(002)}$ of 0.68 to 0.72 nm.

When the carbon coverage of particulate core is made by chemical vapor deposition, the carbon formed on the surface of the particulate core can easily have a lattice constant $C_{0(002)}$ of 0.69 to 0.71 nm which falls in the above-mentioned range of 0.68 to 0.72 nm. Thus, chemical vapor deposition as a carbon-covering method enables very easy control of the crystallinity of the carbon formed on the surface of the particulate core. Viewed from this matter as well, chemical vapor deposition is particularly preferable as a method for covering the surface of the particulate core with carbon.

A lithium secondary battery using the anode material of the present invention must be charged under the conditions different from those employed for lithium secondary batteries using conventional anode materials of carbon or graphite type. When a lithium secondary battery using the present anode material is charged at 1 to 5 mV (reference electrode= metallic lithium) which is the same as for conventional carbon or graphite type anode materials, deep charging takes place, which invites formation of an alloy of high lithium content, consequent powderization of alloy, and deterioration of cycle property.

Hence, in a secondary battery using the anode material of the present invention, its charging need be conducted at a given charging density, i.e. charging amount per unit weight of anode material. Incidentally, in calculation of the above charging density, the weight of anode material is taken as the total weight of (1) the weight of particulate core, i.e. metal or semimetal capable of forming a lithium alloy and (2) the weight of carbon covering particulate core.

For example, when silicon is used as the particulate core of anode material, the charging densities necessary for formation of various lithium-silicon alloys are as follows, wherein a charging density means a charging amount per unit weight of silicon. That is, $Li_{0.54}Si$ alloy is formed at a charging density of 500 mAh/g; $Li_{0.87}Si$ alloy is formed at 750 mAh/g; $Li_{1.2}Si$ alloy is formed at 1,000 mAh/g; $Li_{2.2}Si$ alloy is formed at 1,500 mAh/g; and $Li_{4.4}Si$ alloy is formed at 2,200 mAh/g.

Thus, as the charging density is larger, the lithium content in the lithium-silicon alloy formed is higher. When alloying proceeds to $Li_{4.4}Si$ alloy, powderization of alloy is inevitable. Therefore, the charging density is necessary to be 1,500 mAh/g or less, preferably 1,000 mAh/g or less to avoid powderization of alloy.

When the charging density is 1,500 mAh/g or less, powderization of alloy and deterioration of cycle property are prevented sufficiently. For example, when the charging density is 750 mAh/g or less, a life of 1,000 cycles or more is possible.

By, in charging of a lithium secondary battery using the anode material of the present invention, controlling not only the charging density but also the charging voltage, particularly the final charging voltage, it is possible to obtain a safer and higher-capacity battery.

For example, when silicon is used as the particulate core of anode material, the final charging voltage is preferably 30 to 100 mV (reference electrode=metallic lithium), more preferably 50 to 80 mV (reference electrode=metallic lithium).

A final charging voltage of lower than 30 mV (reference electrode=metallic lithium) is not preferred because too large a charging depth is obtained at a high probability. A final charging voltage of higher than 100 mV (reference electrode=metallic lithium) is not preferred, either, because it invites insufficient charging or requires too long a charging time.

In the most preferred charging, constant-current charging and constant-voltage charging are used in combination. For example, constant-current charging is conducted at an appropriate current at the start of charging; after the charging voltage has reached 30 to 100 mV (reference electrode= metallic lithium), this voltage is kept and constant-voltage charging is conducted until the charging density reaches 500 to 1,000 mAh/g.

By conducting charging under such conditions, excessive alloying of silicon (used as the particulate core of anode material) with lithium can be avoided.

As a result, powderization of lithium-silicon alloy can be prevented and there can be obtained a lithium secondary battery having a high discharging capacity and excellent cycle property.

Since a high final charging voltage of 30 to 100 mV (reference electrode=metallic lithium) is used, there is neither deposition of metallic lithium on anode nor formation of dendrite, during charging, and a highly safe battery can be obtained.

The lithium secondary battery of the present invention can be assembled using the above-mentioned anode material and the later-described collector, binder, cathode material, separator, electrolytic solution, etc.

There is no particular restriction as to the method for producing an anode of lithium secondary battery using the anode material of the present invention. For example, the present anode material is sufficiently kneaded with a binder and a solvent; then, the kneaded material is press-bonded to a collector such as metal mesh, metal foil or the like; thereby, an anode can be produced.

As the binder, there can be used a known material, for example, a pitch or a polytetrafluoroethylene. Of these materials, preferred are a polyvinylidene fluoride (hereinafter referred to as PVDF), an ethylene-propylene-diene polymer (hereinafter referred to as EPDM) and carboxylmethyl cellulose (hereinafter referred to as CMC).

As to the cathode material used, there is no particular restriction. However, there are preferred, for example, lithium-containing oxides such as $LiCoO_2$, $LiNiO_2$, $LiMn_2O_4$ and the like. To a powdery cathode material are added a binder and, as necessary, a conductive material, a solvent, etc.; the resulting mixture is sufficiently kneaded; the kneaded material is press-bonded to a collector to obtain a cathode.

As to the separator used, there is no particular restriction, either, and a known material can be used.

As the non-aqueous solvent of electrolytic solution, used in the present invention, there can be mentioned a known aprotic solvent of low dielectric constant capable of dissolving a lithium salt (electrolyte). The solvent includes, for example, ethylene carbonate (hereinafter referred to as EC), dimethyl carbonate (hereinafter referred to as DMC), methyl ethyl carbonate (hereinafter referred to as MEC), propylene carbonate (hereinafter referred to as PC), diethylene carbonate, acetonitrile, propionitrile, tetrahydrofuran, γ-butyrolactone, 2-methyltetrahydrofuran, 1,3-dioxolane, 4-methyl-1,3-dioxolane, 1,2-dimethoxyethane, 1,2-diethoxyetane, diethyl ether, sulfolane, methylsulfolane, nitromethane, N,N-dimethylformamide and dimethylsulfoxide. These solvents can be used singly or in admixture of two or more kinds.

The lithium salt used as the electrolyte of electrolytic solution includes $LiClO_4$, $LiAsF_6$, $LiPF_6$, $LiBF_4$, $LiB(C_6H_5)_4$, LiCl, LiBr, $CH_3SO_3Li$, $CF_3SO_3Li$, etc. These salts can be used singly or in admixture of two or more kinds.

The anode material of the present invention is constituted by a particulate core composed of a metal or semimetal capable of forming a lithium alloy and a carbon layer covering the surface of the particulate core. In this anode material, therefore, the volume expansion of particulate core during its alloying can be reliably prevented by the carbon layer; there is no destruction of anode; the secondary battery produced using the anode material can withstand repeated charging over a long period.

Further, the anode material of the present invention includes a lithium alloy. Therefore, the secondary battery of the present invention shows charging and discharging capacities of 500 to 1,000 mAh/g. This value is far larger than the charging and discharging capacities of conventional lithium ion secondary batteries.

In the anode material of the present invention, carbon is suitable as a covering material for its high conductivity and is relatively easy to apply. Therefore, the present anode material can be easily produced on an industrial scale.

The anode material of the present invention can also be used in lithium solid secondary battery and polymer lithium secondary battery, together with a known cathode, polymer electrolyte, solid electrolyte, etc., whereby a highly safe and high-capacity lithium secondary battery can be produced.

In the present invention, measurements of various properties were made according to the following methods.

Average particle diameter and particle size distribution
Measured using a laser type particle size distribution tester, SALD-1000, produced by Shimadzu Corporation.

Specific surface area
Measured from nitrogen adsorption amount at a liquid nitrogen temperature according to the BET method, using a high-accuracy completely automatic gas adsorption tester, BELSORP 28, produced by Nippon Bell K.K.

XRD (X-ray diffraction)
Measured using an X-ray diffractometer, RINT 1,400, produced by Rigaku Denki K.K.

Amount of covering carbon
Using a thermogravimetric analyzer, TG-50, produced by Shimadzu Corporation, a sample was heated to 900° C. in an air current to burn the carbon in the sample; the resultant weight decrease of the sample was determined; therefrom was calculated the amount of covering carbon in the sample.

EXAMPLES

The present invention is described more specifically below by Examples.

EXAMPLES 1 to 5

A silicon powder (first class grade chemical) having an average particle diameter of 8 μm produced by Wako Pure Chemical Industries, Ltd. was used as a particulate core of anode material. 500 g of this silicon powder was placed in stainless steel vessel having an internal volume of 1,000 ml. The inside of the vessel was purged with nitrogen with stirring. The inside temperature of the vessel was elevated to 950° C.; a benzene vapor was introduced into the vessel from the bottom; and chemical vapor deposition was conducted for 60 minutes, 120 minutes, 180 minutes, 240 minutes or 300 minutes.

The vessel was cooled to room temperature in a nitrogen current, and a chemical vapor deposition product was taken out from the vessel to obtain five kinds of anode materials.

Each anode material was measured for amount of covering carbon, average particle diameter, specific surface area and XRD. The results are shown in Table 1.

TABLE 1

|  | Examples | | | | |
| --- | --- | --- | --- | --- | --- |
|  | 1 | 2 | 3 | 4 | 5 |
| Time of chemical vapor deposition (min) | 60 | 120 | 180 | 240 | 300 |
| Amount of covering carbon (wt. %) | 12 | 22 | 27 | 38 | 48 |
| Average particle diameter (μm) | 14.3 | 15.4 | 16.2 | 18.2 | 24.5 |
| Specific surface area ($m^2/g$) | 0.5 | 0.5 | 0.7 | 0.8 | 0.8 |
| Lattice constant of covering carbon, $C_{0(002)}$ (nm) | 0.700 | 0.700 | 0.705 | 0.706 | 0.700 |
| Components detected by XRD | C, Si, $SiO_2$ | C, Si, $SiO_2$ | C, Si, $SiO_2$ | C, Si, $SiO_2$ | C, Si, $SiO_2$ |

The XRD profile of the anode material of Example 2 is shown in FIG. 1.

In FIG. 1, the axis of abscissa is diffraction angle (2 θ) and the axis of ordinate is strength, and the peaks of standard silicon and standard silicon oxide are shown together.

From the XRD profile are detected covering carbon, silicon and silicon oxide (this silicon oxide was present as an impurity in the silicon used). However, silicon carbide (a reaction product of carbon and silicon) is not detected in the profile.

By using each of the above-produced anode materials as a cathode and metallic lithium as an anode, a battery of non-aqueous solvent type was produced. The performance of each anode material as an anode material for lithium ion secondary battery was evaluated by subjecting the produced battery to a charging and discharging test.

The cathode using the above-produced anode material of the present invention was produced as follows.

To 10 parts by weight of the present anode material was added an N-methylpyrrolidone solution containing 1 part by weight of a PVDF as a binder, and they were mixed thoroughly to form a paste. The paste was coated on a circular stainless steel sheet (2.5 $cm^2$) and the coated sheet was subjected to pressure molding at a pressure of 1 ton/cm². The resulting material was vacuum-dried at 160° C. for 2 hours to prepare a cathode.

As the anode, metallic lithium was used.

As the electrolytic solvent, there was used a 1:2 (by volume ratio) mixed solvent consisting of ethylene carbonate and dimethyl carbonate.

As the electrolyte, LiPF$_6$ was used at a concentration of 1.0 mol/l.

As the separator, a porous polypropylene non-woven cloth was used. A glass fiber filter paper was impregnated with an electrolytic solution, and a coin-shaped cell was produced in an argon atmosphere. The current densities during charging and discharging were 100 mA/g and 0.4 mA/cm², respectively.

The results of evaluation of the performance of each anode material are shown in Table 2.

metallic lithium) and is higher than 1 to 5 mV (reference electrode=metallic lithium) in using a conventional carbon- or graphite-based anode material.

Figure 3:
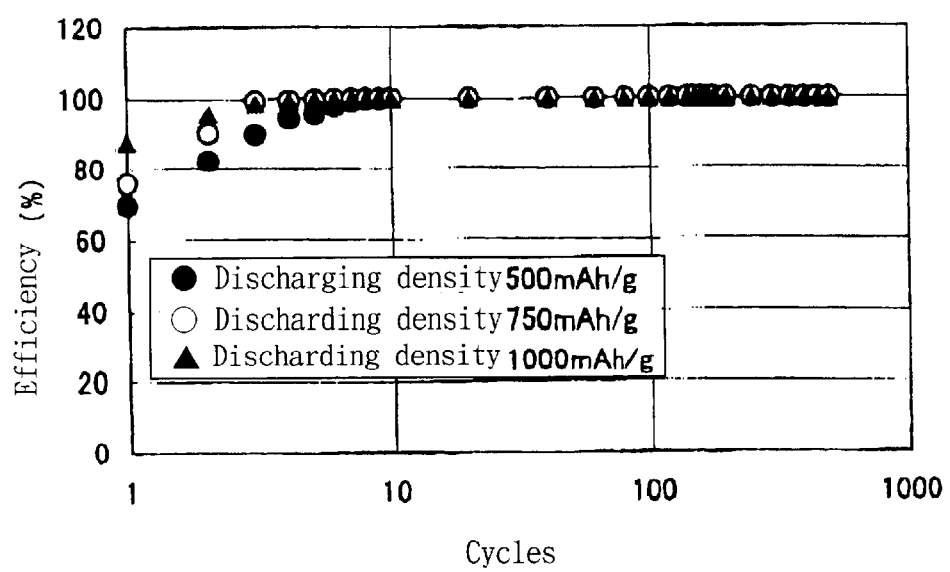
FIG. 3 is a graph showing the effect of discharging conditions on cycle property, obtained for the anode material of example 4.

A charging and discharging test was conducted also for the anode material of Example 4 wherein the time of chemical vapor deposition was 240 minutes. The cycle properties when the discharging density was 500, 750 or 1,000 mAh/g, are shown in FIG. 3.

It is clear that the anode material of the present invention is excellent in cycle property.

COMPARATIVE EXAMPLE 1

The silicon powder used in Examples 1 to 5 was mixed with 20% by weight of a conductive carbon black (a product of Asahi Carbon Co., Ltd.), and an electrode was produced in the same manner as in Examples 1 to 5. Using this electrode as a cathode and metallic lithium as an anode, a battery was produced, and the performance of the electrode was measured in the same manner as in Examples 1 to 5.

TABLE 2

|  | Example 1 | Example 2 | Example 3 | Example 4 | Example 5 | Comparative Example 1 |
| --- | --- | --- | --- | --- | --- | --- |
| Time of chemical vapor deposition (min) | 60 | 120 | 180 | 240 | 300 | — |
| 1 cycle | | | | | | |
| Discharging density (mAh/g) | 956 | 956 | 956 | 957 | 957 | 956 |
| Discharging voltage (mV) | 70 | 70 | 70 | 70 | 70 | 70 |
| Charging density (mAh/g) | 766 | 785 | 798 | 838 | 815 | 675 |
| Efficiency (%) | 80.1 | 82.1 | 83.5 | 87.6 | 85.2 | 70.6 |
| 5 cycles | | | | | | |
| Discharging density (mAh/g) | | | | | | 957 |
| Discharging voltage (mV) | | | | | | 42 |
| Charging density (mAh/g) | | | | | | 552 |
| Efficiency (%) | | | | | | 57.7 |
| 10 cycles | | | | | | |
| Discharging density (mAh/g) | 957 | 956 | 956 | 956 | 956 | 957 |
| Discharging voltage (mV) | 68 | 69 | 69 | 69 | 70 | −1.2 |
| Charging density (mAh/g) | 950 | 953 | 953 | 954 | 953 | 426 |
| Efficiency (%) | 99.3 | 99.7 | 99.7 | 99.8 | 99.7 | 44.5 |
| 100 cycles | | | | | | |
| Discharging density (mAh/g) | 956 | 957 | 956 | 956 | 956 | |
| Discharging voltage (mV) | 66 | 67 | 67 | 68 | 69 | |
| Charging density (mAh/g) | 949 | 946 | 952 | 954 | 953 | |
| Efficiency (%) | 99.3 | 98.9 | 99.6 | 99.8 | 99.7 | |

The performance of each anode material was expressed by indicating the ratio of charging density (amount of electricity liberated from alloy) to discharging density (amount of electricity required for alloying), i.e. 956–957 mAh/g, as efficiency.

Incidentally, in this charging and discharging test, the present anode material was used as a cathode and metallic lithium was used as an anode. Therefore, the terms "discharging" and "charging" used in this test have opposite meanings to those used in actual secondary batteries.

Figure 2:
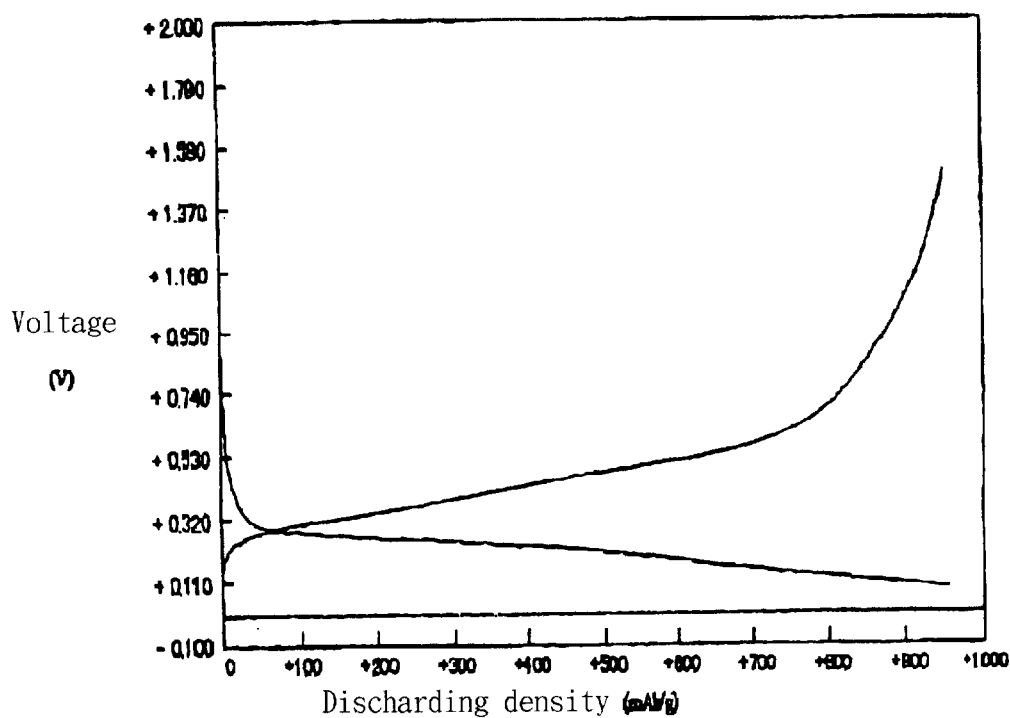
FIG. 2 is charging and discharging curves at the 10th cycle of the anode material of Example 2.

The charging and discharging curves of the 10th cycle of the anode material of Example 2 are shown in FIG. 2.

In FIG. 2, the axis of abscissa is discharging density (total amount of electricity contributed to alloying), and the axis of ordinate is discharging voltage or charging voltage.

The curve of descending tendency refers to discharging voltage and the curve of ascending tendency refers to charging voltage.

It is clear that the voltage in using the present anode material of Example 2 is 70 to 100 mV (reference electrode=

The performance of the battery when the discharging density was 956–957 mAh/g, is shown in Table 2.

It is clear from Table 2 that the anode material obtained by mere mixing of silicon and carbon shows striking deterioration of cycle property and is unusable as an anode material.

What is claimed is:

1. An anode material for a lithium secondary battery, comprising
    a particulate core comprising silicon, boron or titanium; and
    a carbon layer covering the surface of the particulate core, wherein the carbon content in the anode material is 5 to 50% by weight.

2. An anode material for a lithium secondary battery according to claim 1, wherein said particulate core comprises silicon.

3. An anode material for lithium secondary battery according to claim 1 or 2, wherein the average particle diameter of the particulate core is 0.1 to 50 μm and the specific surface area of the anode material is 5 m²/g or less.

4. An anode material for lithium secondary battery according to claim 1 or 2, wherein the carbon layer covering the surface of the particulate core is formed by chemical vapor deposition.

5. An anode material for lithium secondary battery according to claim 1 or 2, wherein the carbon in the anode material has a lattice constant $C_{0(002)}$ of 0.680 to 0.720 nm.

6. A lithium secondary battery comprising, in the anode, an anode material as set forth in claim 1.

7. A lithium secondary battery comprising, in the anode, an anode material as set forth in claim 2.

8. The anode material of claim 1, wherein said particulate core comprises boron.

9. The anode material of claim 1, wherein said particulate core comprises titanium.

10. The anode material of claim 1, wherein said particulate core consists of silicon.

11. The anode material of claim 1, wherein said particulate core consists of boron.

12. The anode material of claim 1, wherein said particulate core consists of titanium.

13. A method for charging a lithium secondary battery, comprising charging the battery of claim 6.

14. A method for charging a lithium secondary battery, comprising charging the battery of claim 7.

15. A method for charging of a lithium secondary battery as set forth in claim 14, wherein the charging density is 1,500 mAh/g or less.

16. A method for charging of a lithium secondary battery as set forth in claim 14, wherein the final charging voltage is 30 to 100 mV (reference electrode=metallic lithium).

17. A method for charging of a lithium secondary battery as set forth in claim 13, wherein the charging density is 1,500 mAh/g or less.

18. A method for charging of a lithium secondary battery as set forth in claim 13, wherein the final charging voltage is 30 to 100 mV (reference electrode=metallic lithium).

* * * * *